United States Patent [19]

Ash et al.

[11] Patent Number: 5,086,460
[45] Date of Patent: Feb. 4, 1992

[54] COMMUNICATIONS SYSTEM INGRESS AND EGRESS ARRANGEMENT

[75] Inventors: Gerald R. Ash, West Long Branch; Jin-Shi Chen, Holmdel, both of N.J.; Robert A. Gerritsen, Batavia, Ill.

[73] Assignee: AT&T Bell Laboratories, Murray Hill, N.J.

[21] Appl. No.: 503,014

[22] Filed: Apr. 2, 1990

[51] Int. Cl.$^5$ .............................................. H04M 7/06
[52] U.S. Cl. ................................... 379/221; 379/134
[58] Field of Search ............... 379/221, 220, 113, 134

[56] References Cited

U.S. PATENT DOCUMENTS

| | | | |
|---|---|---|---|
| 4,756,019 | 7/1988 | Szybicki | 379/112 |
| 4,979,118 | 12/1990 | Kheradpir | 364/436 |
| 4,991,204 | 2/1991 | Yamamoto et al. | 379/221 |

OTHER PUBLICATIONS

"Use of a Trunk Status Map for Real-Time DNHR", G. Ash, Eleventh International Teletraffic Congress, Sep. 1985, pp. 4.4A-4-1-7.

"A Survey of Dynamic Routing Methods for Circuit-Switched Traffic", B. Hurley et al, *IEEE Communications Magazine*, vol. 25, No. 9, Sep. 1987, pp. 13-21.

*Primary Examiner*—Thomas W. Brown
*Attorney, Agent, or Firm*—Fredrick B. Luludis

[57] ABSTRACT

A communications network is arranged so that an external switching office is connected to the network via multiple ingress/egress nodes such that an originating node which receives a call destined for the external office may route the call through the network to one of the ingress/egress nodes in accordance with a particular class (type) of routing specified in one of a number of routing treatments. Such routing treatments are associated with the external office and at least identify respective ones of the ingress/egress nodes connected to the external office.

31 Claims, 7 Drawing Sheets

FIG. 2

| TREATMENT | TYPE | % TRAFFIC | ROUTE INDICATOR(RI) |
|---|---|---|---|
| TREATMENT 1 | RDB,RTNR or PRT | % | 1,2,3 |
| TREATMENT 2 | RDB,RTNR or PRT | % | 1,2,3 |
| TREATMENT 3 | RDB,RTNR or PRT | % | 1,2,3 |
| — | — | — | — |
| — | — | — | — |
| — | — | — | — |
| — | — | — | — |
| TREATMENT 8 | RDB,RTNR or PRT | % | 1,2,3 |

FIG. 3

| TREATMENT | TYPE | % TRAFFIC | ROUTE INDICATOR(RI) |
|---|---|---|---|
| TREATMENT 1 | RTNR-20 | 100 | 1 |
| TREATMENT 2 | RTNR-30 | — | 1 |

| TREATMENT | TYPE | % TRAFFIC | ROUTE INDICATOR(RI) |
|---|---|---|---|
| TREATMENT 1 | RDB XXXX | 100 | 1 |
| TREATMENT 2 | RTNR-30 | — | 1 |

| TREATMENT | TYPE | % TRAFFIC | ROUTE INDICATOR(RI) |
|---|---|---|---|
| TREATMENT 1 | RDB YYYY | 100 | 1 |
| TREATMENT 2 | RTNR-20 | — | 1 |

| TREATMENT | TYPE | % TRAFFIC | ROUTE INDICATOR(RI) |
|---|---|---|---|
| TREATMENT 1 | RTNR-40 | 100 | 1 |
| TREATMENT 2 | RTNR-50 | — | 3 |

| TREATMENT | TYPE | % TRAFFIC | ROUTE INDICATOR(RI) |
|---|---|---|---|
| TREATMENT 1 | RDB NNNN | 100 | 1 |
| TREATMENT 2 | RTNR-50 | — | 3 |

| TREATMENT | TYPE | % TRAFFIC | ROUTE INDICATOR(RI) |
|---|---|---|---|
| TREATMENT 1 | RDB RRRR | 100 | 1 |
| TREATMENT 2 | RTNR-40 | 0 | 1 |
| TREATMENT 3 | PRT-SSSS | — | 3 |

| TRUNK GROUP | %TRAFFIC |
|---|---|
| TG-aaa | 50% |
| TG-bbb | 25% |
| TG-ccc | 25% |

COMMUNICATIONS SYSTEM INGRESS AND EGRESS ARRANGEMENT

FIELD OF THE INVENTION

The invention relates to routing a call through a complex communications network, and more particularly relates to enhancing such routing at respective ingress and egress points of such a network.

BACKGROUND OF THE INVENTION

A disruption in telecommunications service is typically caused by an inoperable communications path, or switch failure. The path or switch may be one that either connects a plurality of telecommunications users to a local central office or is an element of a inter-exchange switched carrier. In either case, a disruption in telecommunication service could be very costly to business users who rely on telephone services in the operation of their respective businesses. For example, a business could lose revenue as a result of a failure to receive so-called "telemarketing sales" as a result of such a disruption. Moreover, the amount of lost revenue would be directly proportional to the duration of the disruption.

Accordingly, a need arises for enhancing the reliability of the telecommunication service that is provided to a particular locality even though an element in the associated communications network, either at the local central office end or inter-exchange switched carrier end of the network becomes inoperable.

SUMMARY OF THE INVENTION

The telecommunication service that is provided to a particular locality or business customer is enhanced, in accordance with the invention, by connecting a local switching office, a private branch exchange, computer terminal or overseas international switching center, to a plurality of nodes (switching offices) of an associated inter-exchange switched carrier via respective communications paths. As such, a local switching office is provided with multiple ingress and egress points for receiving and transmitting telephone calls that are routed via the inter-exchange switched carrier (telecommunications network).

As an aspect of the invention, each node of the inter-exchange switched carrier which routes a call associated with multiple egress points does so in accordance with a respective multiple routing treatment table to prevent the call from possibly being shuttled between nodes.

BRIEF DESCRIPTION OF THE DRAWING

FIG. 2 illustrates in general form a Multiple Routing Treatment Table (MRTT) that is used to route a call within the network of FIG. 1, in accordance with the principles of the invention;

FIGS. 3-5 illustrate examples of MRTTs that may be employed in the routing of a call through the network of FIG. 1;

FIGS. 7-9 illustrate other examples of MRTTs that may be employed in the routing of a call through the network of FIG. 6;

FIG. 10 illustrates a so-called proportional routing table;

DETAILED DESCRIPTION

Figure 1:
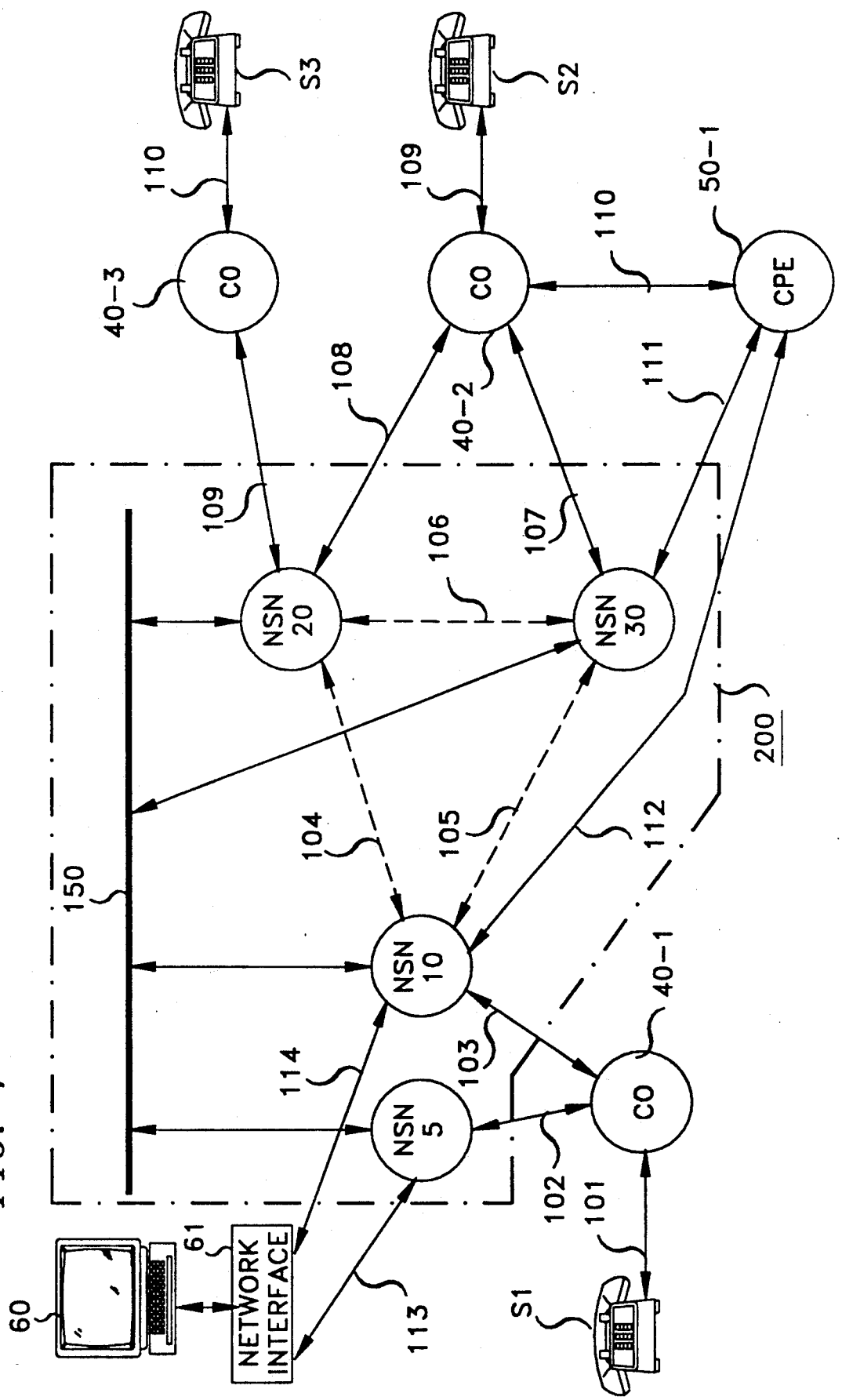
FIG. 1 is a broad block diagram of an illustrative telecommunications network in which the invention may be practiced.

The invention may be advantageously practiced in connection with the routing of a call through a telecommunications network, which may be, for example, the AT&T inter-exchange switched network. A switched network comprises a plurality of switching centers, or nodes, a number of which are shown in FIG. 1. Each node of network 200, e.g. node 10, comprises, inter alia, what is commonly referred to as an electronic switching office, such as, for example, the well-known No. 4 ESS available from AT&T. (The No. 4 ESS is disclosed in the publication of the *Bell System Technical Journal*, Vol. 56, No. 7, September, 1977, pp. 1015-1336, which is hereby incorporated by reference.) Network 200 also includes a common channel signaling (CCS) network 150, which is connected to each of the nodes forming network 200. Network 150 is the means by which the nodes of network 200 communicate with one another in order to route a call from an origination node to a destination node, as will be discussed below.

Also shown in the FIG. are local central offices (CO) 40-1 and 40-2 associated with respective local exchange carriers (not shown). As is well-known, a CO is arranged to route long distance calls that it receives from its respective subscribers to a long distance carrier, such as the AT&T network.

It is seen from the FIG. that the reliability of the communications path between a CO, e.g., CO 40-2, and long distance network 200 is enhanced, in accordance with an aspect of the invention, by arranging CO 40-2 so that it "homes in" on (is connected to) a plurality of the nodes—illustratively two nodes—of network 200. Accordingly, in the event that a first communications path between CO 40-2 and network 200 becomes disabled, for whatever reason, or in the event that the associated network 200 node is overloaded, then a long distance call may still be routed to the CO via the second communication path connected between the CO and another network 200 node. For example, if node (Network Switch Number) 30 is overloaded or failed, then a call that is being routed through network 200 and destined for CO 40-2 may, nevertheless, be completed via node (NSN) 20 and path 108, all in accord with the aspect of the invention.

Conversely, a CO, e.g., CO 40-2, may route via either one of the two communications paths 107 or 108 connected between CO 40-2 and network 200 a long distance call that it receives from one of its subscribers. The question arises, however, as to which of its two associated communications paths CO 40-2 will select in the routing of a long distance call to network 200. In an illustrative embodiment of the invention, a CO selects one of its associated paths based on a predetermined parameter, for example, a parameter designed so that a CO divides its long distance traffic (telephone calls) among such paths. In this way, a CO does not overly burden one of the paths connecting it to network 200. It is noted that such a parameter will be referred to herein as proportional routing, in which long distance telecommunications traffic either originating or terminating at a particular CO is, in accord with an aspect of the invention, proportionally divided among the paths that connect the CO to network 200.

(It is to be understood of course that another parameter could be used to determine the manner in which telecommunications traffic is divided among a plurality of paths. For example, the selection of one of two paths could be based on whether the value of a random number is either even or odd, respectively.) Alternatively, a statistical approach could be used to make such a selection. For example, the selection could be based on the value of the contents of a counter circulating through the values of 1 through 100 at a very high rate. Then, if calls to a particular CO are divided among three alternate paths A, B and C commensurate with proportions of 30%, 50% and 20%, respectively, then path A, B, or C is selected if the current counter value happens to be within the range of 1–30, 31–80 or 81–100, respectively.)

Specifically, a telecommunications subscriber, for example, a subscriber located at station set S1, may place a long distance telephone call to another subscriber located at, for example, station S2, by dialing the destination (called) number assigned to station S2. CO 40-1, in turn, collects the digits defining the destination number as they are received via telecommunications line 101 connected between station S1 and CO 40-1. Based on receipt of a predetermined number of digits forming the number—illustratively 10—CO 40-1 determines that the call is a long distance call. As such, CO 40-1 takes steps to route the call to its destination via network 200. (It is noted that if a telecommunications call happens to be a so-called local call, then CO 40-1 would route the call to its destination via its associated local exchange carrier's network.)

It is seen from the FIG. that CO 40-1 connects to two network 200 nodes via paths 102 and 103, respectively. As is well-known, a CO accesses such paths via what is commonly referred to as toll-connect trunks. Accordingly, CO 40-1 would connect station S1 to either path 102 or path 103 via a respective toll-connect trunk circuit based on the aforementioned proportional routing criteria so that the long distance traffic that CO 40-1 supplies to network 200 is divided between nodes 5 and 10. It is apparent that the division of such traffic may be in accord with one of a number of different proportions, in which the proportion would take into account the level of traffic that a network 200 node receives from other COs (not shown). Thus, a proportion could be, for example, 50—50, in which CO 40-1 equally divides its long distance traffic between nodes 5 and 10. The proportion, on the other hand, could be, for example, 70–30, in which CO 40-1 supplies 70% of such traffic to node 10 and the remainder to node 5. It is noted that the same holds equally well for CO 40-2 and other COs (not shown) connecting to network 200.

Continuing, it is assumed at this point that CO 40-1 in accord with the aforementioned proportional routing parameter seizes a toll-connect trunk connected to path 103, and supplies (outpulses) to node 10, inter alia, the called telephone number. Node 10 responsive to receipt of that information translates the called telephone number into a respective memory index, as will be discussed below. Armed with the index, node 10 then unloads from its internal memory what we call a Multiple Routing Treatment Table (MRTT) defining, in accordance with an aspect of the invention, the routing treatment that is used to route a respective telephone call identified by the received telephone number to the destination CO, i.e. CO 40-2. At the destination CO, the call is then routed, in the conventional manner, to the telecommunications station identified by the destination number.

Turning now to FIG. 2, there is shown an example of an MRTT in general form. In particular, an MRTT may have up to eight entries with each entry comprising—illustratively four—fields, identified as treatment, type, % traffic and route indicator (RI), respectively. Each treatment in a MRTT is consecutively numbered one through eight and refers to the treatment identified in the associated type field. The type field specifies one of a number—illustratively three—treatments that may be accorded a respective call, namely (a) RDB (hierarchical routing treatment), (b) RTNR (Real-Time Network Routing treatment) and (c) PRT (Proportional Routing treatment). Hierarchical routing is a well-known method of routing telephone calls and refers to the routing of a call between switching centers based on the hierarchical ranking of the centers, such as the ranking between, for example, node 30 and CO 40-2. NSN (RTNR) refers to routing a call for which there is no available direct route or circuit between an origination switch (node) and a destination switch via an intermediate switch identified by data provided by the destination switch. (RTNR is disclosed in U.S. patent application Ser. No. 291,845 filed Dec. 29, 1988 in behalf of G. R. Ash et al, abandoned in favor of Ser. No. 501,344, is hereby incorporated by reference.)

The percent (%) traffic field specifies the level of traffic that should be handled by the respective treatment, in which the sum of the percentages specified in an MRTT should equal 100 percent. A node selects the first choice treatment in proportion to the percentage, and selects as a next choice the treatments starting from the top of the MRTT list and skipping the first choice treatment. For example, if routing treatments 1 and 2 respectively specify 75% and 25%, then treatment 1 would be the first-choice for 75% of the calls and treatment 2 would be the first choice for 25% of the calls. As a further example, if routing treatments 1 and 2 both specify 50% traffic, then either treatment may have a 50% chance of being selected as the first choice treatment. If routing treatment 2 is selected as the first treatment, and the call is blocked using that treatment, then the node will attempt to complete the call using routing treatment 1, as will be explained below in detail. The value in the RI field indicates which treatment(s) a terminating node should apply to a given call that it has received, as will be discussed below.

FIGS. 3–5 illustrate MRTTs 10-1, 20-1 and 30-1 which are stored in the memory of nodes 10, 20 and 30, respectively, and which define the routing treatments that the latter nodes will accord a call that is being routed to the associated destination CO, namely CO 40-2. The manner in which a node uses an MRTT in the routing of call will now be discussed in connection with FIGS. 1 and 3–5.

Specifically, upon obtaining MRTT 10-1 from its internal memory, node 10 will attempt to route to node 20 the station S1 call as specified by the first choice routing treatment contained in MRTT 10-1. It is seen from FIG. 3, that the first choice routing treatment contained in table 10-1 specifies that the 100% of the calls originating at node 10 and destined for CO 40-2 are routed through node 20 using RTNR and that the value of the routing indicator is one. (It is noted at this point that in an illustrative embodiment of the invention, only an originating node is permitted to use RTNR to route a call to its destination. This is done to prevent a call from being "shuttled" between an originating node and a terminating node via one or more intermediate nodes, as will be noted below.)

To route a call to node 20 using RTNR, node 10 first attempts to send the call to node 20 via available direct capacity. If such capacity is not available, then node 10 sends to node 20 via CCS network 150 a message requesting the identity of intermediate (via) network nodes having available direct links (communications paths) connecting to node 20. Node 20 responsive to receipt of the message returns to node 10 via CCS path 150 one or more so-called bit maps detailing the requested information. Node 10 upon receipt of the latter information "ands" the node 20 bit map(s) with bit map(s) of its own, which detail the availability of direct links extending from node 10 to the nodes listed in the received bit map(s). Node 10 then "ands" the result with a bit map identifying so-called "allowed" intermediate nodes that node 10 may use to route a call to node 20, as discussed in the aforementioned U.S. application Ser. No. 291,845. Node 10 then selects from the final result an intermediate node having an available direct link to node 20 and routes to the intermediate node the call originated by station S1. For the sake of clarity, the intermediate node is not shown in FIG. 1, but is represented therein by communication path 104 shown as a dashed line. Thus, a dashed line shown in FIG. 1 is to be taken to mean a communication path which contains one or more intermediate nodes. Accordingly, paths 104 through 106 will be referred to herein as RTNR paths.

In addition, node 10 sends to node 20 via CCS path 150 a message identifying, inter alia, the destination number of the call that is being routed via the intermediate node and the routing indicator associated with the first choice routing treatment. When the intermediate node receives the call, it selects from a toll-connect trunk group contained within path 104 an available trunk and routes the call to node 20 via the selected trunk. Upon receipt of the call, node 20 translates into a memory index various parameters associated with the received call, one such parameter being, for example, the called telephone number. Armed with the index, node 20 then unloads from its internal memory (not shown in FIG. 1) MRTT 20-1. Node 20 may select from MRTT 20-1 a routing treatment whose associated routing indicator has a value that is either equal to or less than the value of the routing indicator that node 20 received from node 10. In the present illustrative example, and as noted above, the received routing indicator has a value of one. Node 20 may therefore select from MRTT 20-1 a routing treatment having a routing indicator equal to or less than the value of one, which would be the first choice routing treatment noted in MRTT 20-1. It is seen from MRTT 20-1 that the first choice routing treatment specifies hierarchical routing (RDB). Accordingly, using the value xxxx contained in the type field, node 20 indexes a table contained in the memory of node 20 to unload the identity of an outgoing trunk group connecting node 20 to CO 40-2 via path 108. If the identified trunk group contains an available outgoing trunk, then node 20 seizes that trunk and routes the call to CO 40-2, thereby completing the routing of the call from station S1 to station S2.

It is noted that node 20 is treated herein as being a terminating node since it is the last network 200 node to handle the call. As such, in the event that an outgoing trunk connecting node 20 to CO 40-2 is not available, then node 20 could not use the second, or last choice, RTNR routing treatment noted in MRTT 20-1 to route the call to CO 40-2. As mentioned above, this is done to prevent shuttling, in which a call could be continuously routed (shuttled) among a group of network nodes.

If node 20 finds that it cannot route the call to CO 40-2 using routing treatment 1 of MRTT 20-1, then node 20-1 "cranks back" the call back to node 10. That is, node 20 returns to node 10, via CCS network 150 and any intermediate node that may be present in path 104, what we call an "egress busy" signal as an indication that the call has been blocked at the terminating node. Node 10 responsive to receipt of that signal disconnects the RTNR path established between nodes 10 and 20, i.e., path 104, and then determines if the call may be routed using another routing treatment. As seen from FIG. 3, MRTT 10-1 has one remaining routing treatment, namely, RTNR routing treatment 2, that may be used to route a call from node 10 to CO 40-2.

Accordingly, node 10 may route the call to node 30 using an RTNR path, that is, via an intermediate node, in the manner described above for routing the call to node 20. Node 30 responsive to receipt of the call would unload from its internal memory MRTT 30-1. Similarly, node 30 would route the call to CO 40-2 using hierarchical routing (as specified by routing treatment 1 of MRTT 30-1) by seizing an outgoing trunk directly connecting node 30 to CO 40-2. If node 30 finds that an outgoing trunk is not available, then node 30 would return to node 10 the aforementioned egress-busy signal via CCS network 150 (and via any intermediate node that is in the RTNR path as represented by path 105).

Similarly, responsive to receipt of the latter egress-busy signal, node 10 would disconnect the RTNR path and then reaccess MRTT 10-1. However, in this instance node 10 would find that it had used the last choice treatment specified in MRTT 10-1 to route the call to CO 40-2. Accordingly, node 10 would block the call by returning to CO 40-1 via path 103 a signal noting that fact. CO 40-1, in turn, may then, if it is so arranged, route the call to the node 5, as an alternate way of establishing a path to CO 40-2. CO 40-1, on the other hand, could supply to station S1 the blocking signal received from node 10.

(As an aside, if it is assumed that station S3 places a call to station S2 via CO 40-3 and node 20, then in that instance, node 20 would be the first network 200 node to handle the call and, therefore, would be classified as the originating node. As such, node 20 would access MRTT 20-1 to obtain the routing treatment that should be used in the routing of the call to CO 40-2. As such, node 20 would attempt to route the call in accord with routing treatment 1 of MRTT 20-1 by seizing an associated outgoing trunk connected to path 108. If such a trunk is not available, for whatever reason, then node 20 may route the call, including an RI of 1, to node 30 via path 106 using RTNR, as specified by routing treatment 2 of MRTT 20-1. Node 30, upon receipt of the call, would unload from its memory MRTT 30-1 that is associated with CO 40-2. Node 30 would then attempt to route the call to CO 40-2 using hierarchical routing as specified by routing treatment 1 of MRTT 30-1 that is selected in accordance with the value of the received RI of 1. Similarly, node 30 achieves such hierarchical routing by routing the call to CO 40-2 via an available outgoing trunk connected to path 107.)

Also shown in FIG. 1 is CPE (Customer Provided Equipment) 50-1, which may be, for example, a so-called private branch exchange. It is seen that the reliability of the communications path between CPE 50-1 and network 200 is significantly enhanced by connecting CPE 50-1 to network 200 via paths 111 and 112. Accordingly, in the event that the communications path 110 between CPE 50-1 and CO 40-2 is unavailable, for whatever reason, CPE 50-1 may, nevertheless, still place long distance calls via paths 111 and 112. FIG. 1 also shows that telecommunications services between network 200 and a terminal, such as, for example, computer terminal 60, which also could be a so-called host computer, is enhanced by connecting terminal 60 to nodes 5 and 10 via respective communications paths 113 and 114. Paths 113 and 114 in this instance would be digital communications paths. Such digital communications paths could be, for example, the AT&T Accunet Switched 56 digital service.

Thus, the reliability of the interface between a network 200 and a local switching facility (e.g., CO, CPE, computer terminal etc.) is enhanced, in accordance with the invention, by "homing" (connecting) such a facility to more than one network node. Moreover, such a facility may include a switching office located in an overseas country, as shown in FIG. 6.

Figure 6:
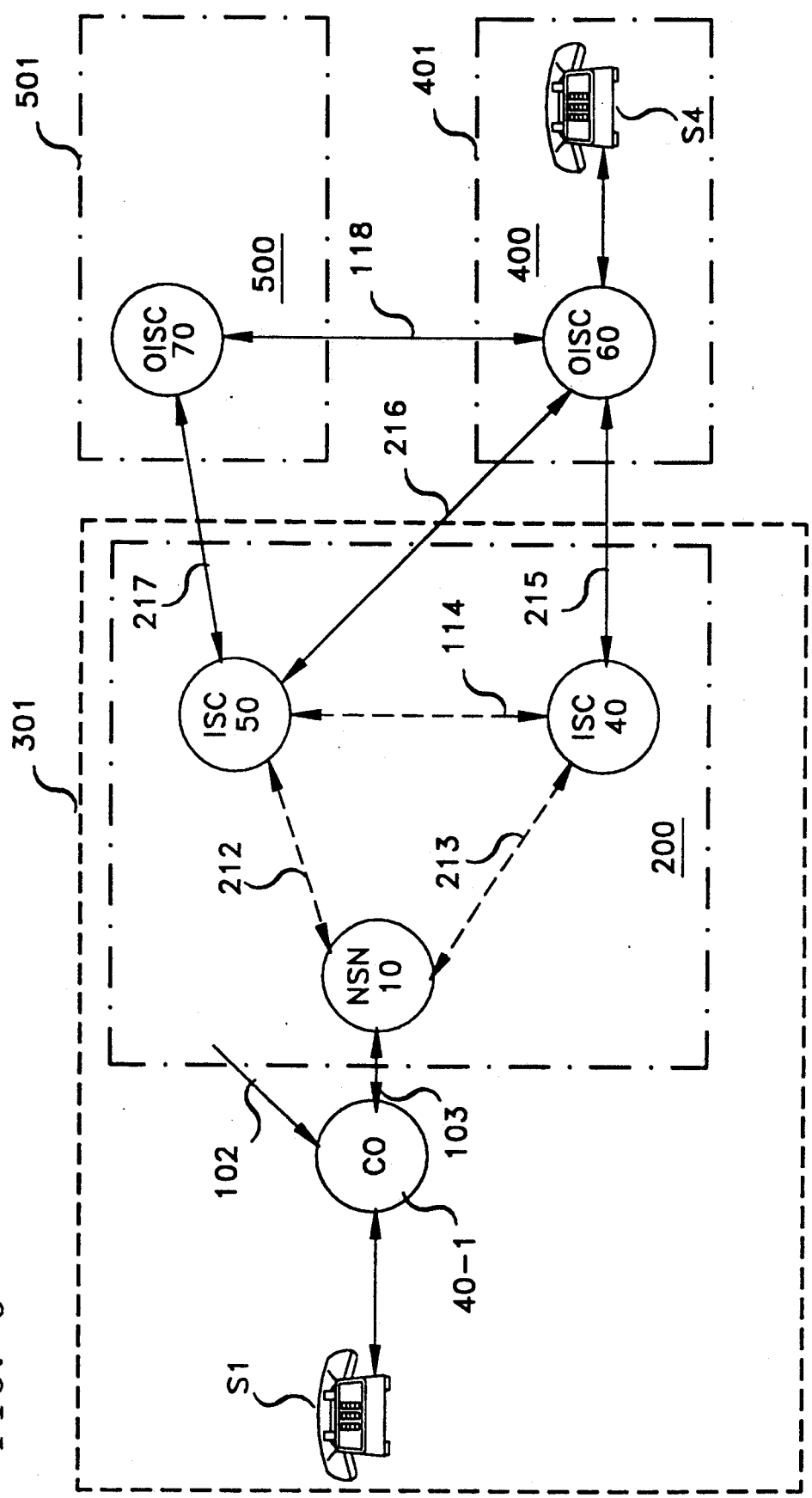
FIG. 6 is a broad block diagram of an international network including the network of FIG. 1.

In particular, and referring to FIG. 6, the switching facilities are arranged such that Overseas International Switching Center (OISC) 60 contained within network 400 and located in a first country 401 (e.g., Great Britain) "homes in on" (connects to) nodes 40 and 50 of the domestic network 200 via respective overseas trunk groups 215 and 216. Nodes 40 and 50 are labeled ISC to indicate that they are international switching centers, which interface domestic network 200 with respective overseas networks. In addition, OISC 70, which is contained in network 500 located in a second country 501, e.g., France, connects to node 50 of network 200 via a respective overseas trunk group 217. OISC 70 may also be arranged so that it connects to another node (not shown) of network 200 via another overseas trunk group (not shown).

With the foregoing in mind, we now discuss the manner in which an overseas call is established between stations S1 and S4, in accordance with the invention, and in which station S1 is assumed to be the originating station. Specifically, and referring to FIGS. 6-9, a user positioned at station S1 may place an overseas call by entering via station S1, inter alia, the destination number assigned to the called station, e.g. station S4, and the code of the country in which the latter station is located. As was discussed above, CO 40-1 receives the digits of the dialed telephone number and passes them to node 10 via path 103. Node 10, in turn, translates the digits into an index to obtain a copy of MRTT 10-2 stored in the memory of node 10.

It is seen that MRTT 10-2 specifies first and second RTNR routing treatments to reach country 401, in which the first routing treatment specifies that 100% of the traffic destined for country 401 and originating at node 10 is to be routed through node, or ISC, 40. Accordingly, node 10 would establish an RTNR path, represented by path 213, to node 40 and pass to the latter node via the CCS network (not shown in FIG. 6), inter alia, the called number. Similarly, Node, ISC, 40 would obtain from its internal memory a copy of MRTT 40-2 associated with country 401, and would attempt to complete the call to country 401 using proportional routing (PRT-NNNN), as specified by routing treatment 1 of MRTT 40-2. However, it is assumed herein that for some reason, i.e., a blocking condition, ISC 40 cannot route the call to OISC 60. Note also that since node 40 is the destination node, it cannot use the RTNR-50 routing treatment 2 specified in MRTT 40-2. Accordingly, node 40 would then crank back the call to node 10 via CCS network 150 (and via any intermediate node in RTNR path 213). Node 10 would then reaccess MRTT 10-2 and route the call to node, or ISC, 50 via alternate RTNR path 212, all in accord with routing treatment 2 of MRTT 10-2. In doing so, node 10 would send to node 50 routing indicator (RI) 3 associated with the latter routing treatment. At node 50, the call would then be routed to OISC 60 via proportional routing path 216 identified using the index RRRR associated with routing treatment 1 of MRTT 50-2.

In particular, routing treatment 1 specifies proportional routing using Proportional Routing Treatment (PRT). PRT routing is used in those instances in which an overseas country, such as Great Britain, may be served by a number of independent long distance networks as well as a national network. Assuming, therefore, that country 401 is one such country, then network 400 and OISC 60 represent each of the networks serving that country, and communications path 216 represents the respective overseas trunks groups which connect ISC 50 to respective ones of those networks. In addition, PRT routing specifies that calls (traffic) routed to country 401 should be apportioned among the networks serving that country commensurate with predetermined ratios (percentages).

To determine the ratios applicable to country 401, node 50, using an index represented by RRRR associated with routing treatment 1 of MRTT 50-2, accesses a table stored in the internal memory of node 50 to determine the identity (memory location) of the PRT table associated with country 401. Using that identity, node 50 then unloads from its memory a copy of the associated PRT table, as shown in FIG. 10.

Specifically, a PRT table comprises a number of fields, two of which are labeled Trunk Group and % Traffic, respectively. Each line of the trunk group field identifies the outgoing trunk group which connects node 50 to a respective one of the networks serving country 401. The % traffic field identifies the percentage of the total traffic that node 50 should route over the associated trunk group. In the present illustrative example, it is assumed that country 401 is served by three independent networks, namely, a first, second and third network. In addition, trunk groups aaa, bbb and ccc connect node 50 to ones of those networks via respective links contained in path 216. Table 50-3 indicates that of the total traffic that node 50 sends to country 401 50% is to be routed via trunk group aaa, 25% via trunk group bbb and 25% via trunk group ccc. Such percentages are calculated and entered in Table 50-3 by a system administrator, and are based on the total number of calls that network 200 receives from country 401 via the respective networks represented by OISC 60. Node 50 as well as other ISC nodes connected to country 401 thus track the number of calls that are received from country 401. Alternatively, such percentages could be calculated by arranging node 50 so that it increments a counter when a call is received over a respective one of the associated trunk groups shown in FIG. 10. The contents of each counter relative to the total number of calls received from country 401 would thus provide a measure of such percentages. Node 50 would clear each such counter at the end of a predetermined period of time—illustratively twenty-four hours—and start tracking new counts over the next succeeding twenty-four hour period.

In particular, to process the received call in accord with routing treatment 1 of MRTT 50-2, node 50 unloads from its the memory the contents of each of the counters associated with the trunk groups listed in table 50-3. Based on the ratios of such contents relative to the total number of calls exchanged with country 401 during current period, node 50 selects one of the trunk groups aaa, bbb or ccc as the means of routing the call to country 401. Node 50 then selects an available (idle) trunk contained within the selected group (represented by path 216) and routes the call to OISC 60. If the selected trunk group does not have an available trunk, then node 50 could, for example, select one of the two remaining trunk groups based on the ratios of their associated counters relative to the total number of calls exchanged with country 401. Similarly, if the second selected trunk group does not have an available trunk, then node 50 could send the call via a trunk contained in the remaining trunk group, if one is available. If that is not the case, then node 50 would attempt to route the call via routing treatment 3 of MRTT 50-2, which is selected in accordance with the value of the routing indicator received from node 10. (It is noted that node 50 cannot select RTNR routing treatment 2 for the reasons discussed above, i.e., node 50 is considered to be a terminating node.) Treatment 3 specifies hierarchical routing (RDB-SSSS) via path 217 to OISC 70 contained in country 501. If such routing is successful, then OISC 70, in turn, would complete the call to country 401 via communications path 118. If such routing is not successful, for whatever reason, then node 50 would return (crankback) to node 10 the aforementioned egress-busy signal, in the manner described above. Responsive to receipt of that signal, node 10 would "break down" the RTNR path to node 50. Node 10 would then return to CO 40-1 a so-called all trunks-busy signal.

Figure 11:
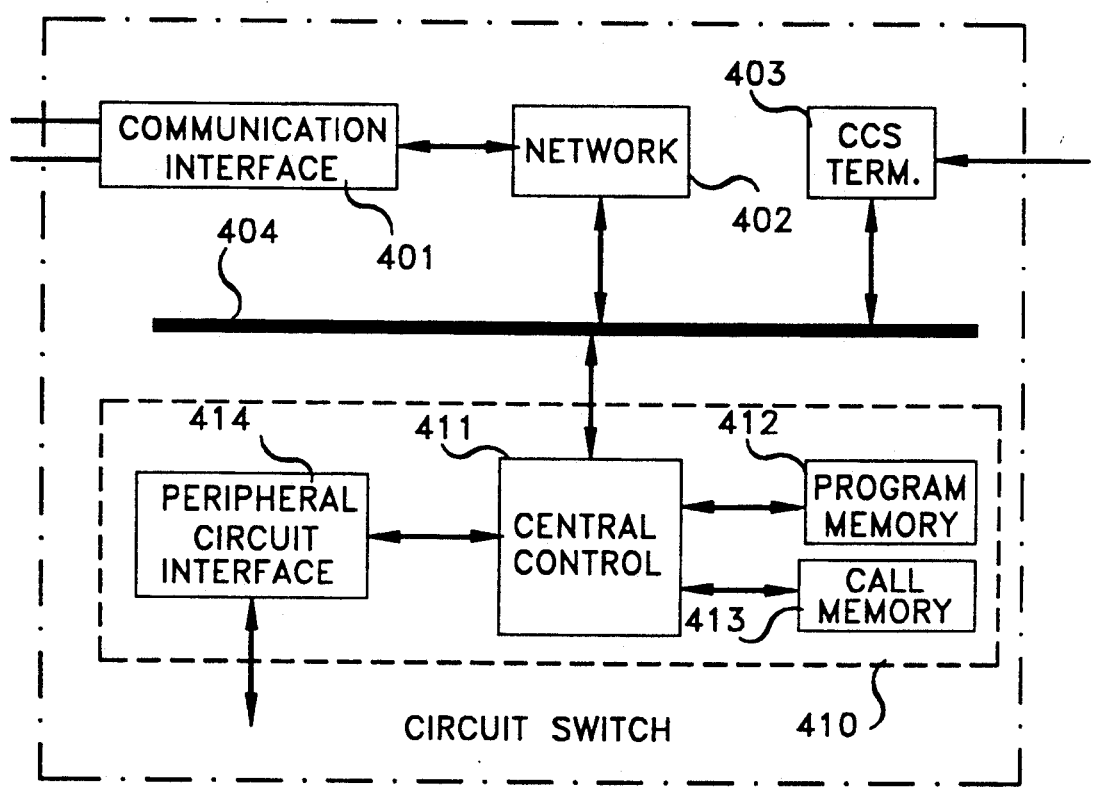
FIG. 11 is a broad block diagram of a node contained in the network of FIG. 1.

Turning now to FIG. 11, there is shown a broad block diagram of a switching center which may be used to implement each of the nodes forming network 200. As mentioned above, a network 200 node may be, for example, the No. 4 ESS that is available from AT&T. In particular, the No. 4 ESS includes, inter alia, (a) CPU 410, which controls the overall operation of the switch; (b) digital network 402, which extends analog telephone calls arriving via respective communications paths to a digital carrier, such as the well-known T1 carrier, forming an individual communications path in network 200; (c) communication interface 401, which interfaces the voice lines with the digital network; and (d) CCS terminal 403, which interfaces CCS transmission facilities 150 with CPU 410 via common bus 404. CPU 410 includes, inter alia, (a) central control 411, (b) program and call memories 412 and 413, and (c) peripheral circuit interface 414 for interfacing a master control console (not shown) to central control 411. The program which implements the invention in a node is stored in memory 412, whereas the various MRTTs, trunk group tables, PRT tables and associated counters are stored in memory 413.

Figure 12:
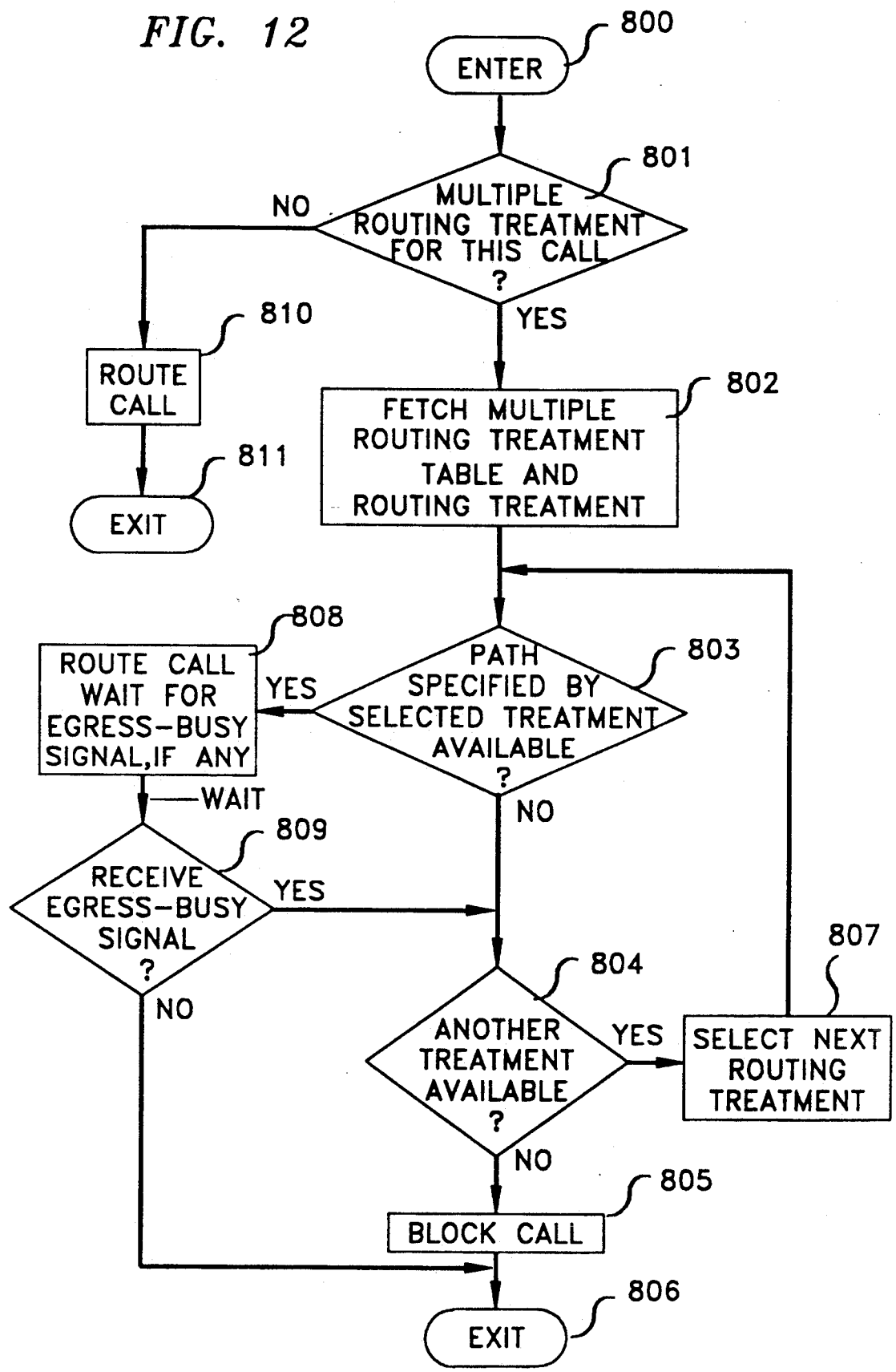
FIGS. 12 and 13 illustrate flow charts detailing the operation of the node of FIG. 11, in accordance with the principles of the invention.
Figure 13:
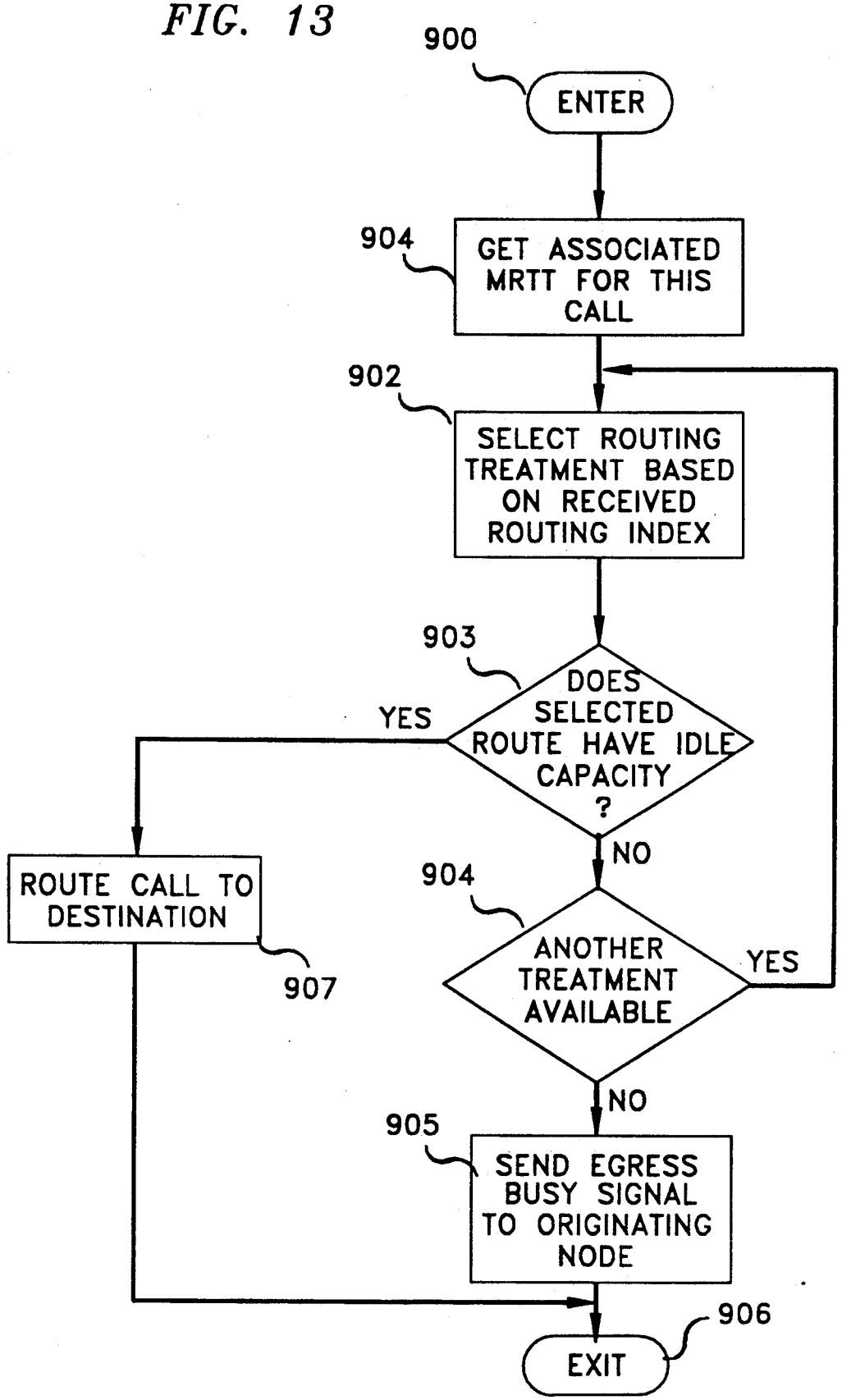

Turning now to FIGS. 12 and 13, there is shown, in flow chart form, the software program which implements the invention in a network node based on whether the node is the originating node (FIG. 12) or terminating node (FIG. 13).

In particular, the program is entered at block 800 of FIG. 12 when the node receives a call from a local CO, PBX, Computer Terminal, or OISC. Entry of the program causes it to proceed to block 801 where the program determines if the call is associated with an MRTT. The program proceeds to block 810 if it finds that the call is not associated with an MRTT. Otherwise, the program proceeds to block 802. At block 810, the program passes the call to another program and then exits at block 811. The other program (not shown) then routes the call to its destination in the conventional manner.

At block 802, the program forms the called number into an index and then obtains from associated memory a copy of the pertinent MRTT and selects a particular first choice routing treatment that will govern the routing of the call to its destination. The program then proceeds to block 803 where it determines if the call can be routed to its destination node in accordance with the type of routing specified by the first choice routing treatment contained in the MRTT, and proceeds to block 808 if it finds that to be the case. Otherwise, the program proceeds to block 804. At block 804, the programs determines if another routing treatment may be used in the routing of the call to its destination and proceeds to block 807 if it finds that to be the case. Otherwise, the program proceeds to block 805 where it blocks the call and then exits via block 806. At block 807, the program selects the next routing treatment and proceeds to block 803. The program then proceeds to block 804 where it checks the associated MRTT to see if another routing treatment may be used to route the call to an alternate destination node. If an alternate (next) treatment is available, then the program proceeds to block 807. Otherwise, the program proceeds to block 805 where it returns to the originating switch a so-called blocking signal. The program then exits via block 806. At block 807, the program selects the alternate, or next, routing treatment and returns to block 803 to route the call via the alternate, or second, path.

At block 808, the program routes the call in accordance with the selected routing treatment and then waits for a predetermined period of time—illustratively 10 seconds—to see if the destination node returns the aforementioned egress-busy signal. At block 809, the program proceeds to block 804 if it finds that it received an egress-busy signal. In doing so, the program disconnects the path to the destination node that returned the latter signal and then checks, at block 804, if another routing treatment is available. Otherwise, the program exits via block 806.

FIG. 13 illustrates the flow chart of the program that is entered when the call is received at the destination node. Specifically, entry of the program at block 900 causes it to proceed to block 901. At block 901, the program obtains from associated memory the MRTT that controls the routing of the call to the destination switch. The program then proceeds to block 902 where it selects the first choice routing treatment in accordance with the value of the associated routing indicator received from the originating node. (It is noted that if the selected treatment specifies RTNR routing, then the program will select the next treatment in accordance with the value of the received routing indicator.) The program then proceeds to block 903 where it checks to see if the trunk group identified by the selected treatment has idle capacity, i.e., an idle outgoing trunk that may be used to route the call to the destination switch. If such a trunk is available, then the program proceeds to block 907 where it causes the call to be routed to the destination switch via the selected outgoing trunk. The program then exits via block 906. If the program finds that an idle outgoing trunk to the destination switch is not available, then the program proceeds to block 904. At block 904, and using the value of the received routing indicator (RI), the program checks to see if an alternate, or second, routing treatment is available for routing the call to its destination. If a second treatment is available, then the program proceeds to block 902 to select that treatment as the next choice of routing the call to its destination, which routing may be in accordance with an RDB treatment or a proportional routing treatment (PRT) if the next choice specifies PRT routing.

If another routing treatment is not available, then the program proceeds to block 905 where it returns to the originating node the aforementioned egress busy, or crankback, signal. The program then exits via block 906.

The foregoing is merely illustrative of the principles of our invention. Those skilled in the art may be able to devise numerous arrangements, which, although not explicitly shown or described herein, embody those principles that are within its spirit and scope. For example, calls that are routed in accordance with associated MRTTs could include voice and data calls. Moreover, the respective MRTT may be selected based on a index derived from the called number and service type, in which a number would identify a particular service. For example, a first service number could be used to identify voice calls and another service number could be used to identify data calls.

We claim:

1. An arrangement for routing traffic through a network, said network comprising a plurality of network nodes and a plurality of communications links interconnecting individual ones of said plurality of network nodes, said arrangement comprising a plurality of other communications links, individual ones of said other communications links respectively connecting at least one switching office external to said network to at least two of said plurality of network nodes so that telecommunications calls may be routed to said external switching office, and means, contained in at least another one of said nodes and operative responsive to receipt of a telecommunications call identifying a telecommunications station served by said external switching office, for routing said call to one of said at least two nodes based on a predetermined percentage of the total number of telecommunications calls that said other node sends to said external switching office via said at least two nodes within a predetermined period of time.

2. The arrangement set forth in claim 1 wherein said predetermined percentage is associated with said one of said at least two nodes and another predetermined percentage is associated with the other one of said at least two nodes, and wherein said means for routing includes means for dividing said total traffic between said at least two nodes in accordance with their associated percentages.

3. The arrangement set forth in claim 2 wherein each of said percentages is associated with a respective routing treatment, said routing treatment specifying (a) the identity of the associated one of said at least two nodes; (b) one of a plurality of routing selections including, but not limited to a class of routing selections specifying either hierarchical or real time network routing; and (c) a respective routing indicator, and wherein said means for routing further includes means for causing said routing indicator to be routed to said one of said at least two nodes along with said telecommunications call.

4. The arrangement set forth in claim 3 wherein said arrangement further comprises means contained in at least said one of said at least two nodes and operative upon receipt of said call and said routing indicator for routing to said external switching office said call in accordance with a first routing treatment stored in said one of said at least two nodes and associated with a routing indicator having a value that is equal to or less than said received routing indicator.

5. The arrangement set forth in claim 4 wherein said means for routing to said external switching office includes means operative in the event that the communications link connecting said one of said at least two nodes to said external switching office is not available for returning to said other node an egress-busy signal.

6. The arrangement set forth in claim 5 wherein said means for routing to said one of said at least two nodes includes means, operative upon receipt of said egress-busy signal, for causing said call to be routed to the other one of said at least two nodes in accordance with a routing treatment associated with the latter node.

7. The arrangement set forth in claim 1 wherein said external switching office is a local switching office.

8. The arrangement set forth in claim 1 wherein said external switching office is customer provided equipment.

9. The arrangement set forth in claim 1 wherein said external switching office is a computer terminal.

10. The arrangement set forth in claim 1 wherein said arrangement further includes means, contained in at least said one of said at least two nodes and responsive to receipt of said call, for then routing said call to said external switching office in accordance with a respective routing treatment stored in said one of said at least two nodes and associated with said external switching office.

11. The arrangement set forth in claim 1 wherein said means for routing to said one of said at least two nodes includes means operative in the event that said call cannot be routed to said one of said at least two nodes for then causing said call to be routed to the other one of said at least two nodes in accordance with a routing treatment associated with the latter node.

12. The arrangement set forth in claim 1 wherein other individual ones of said other communications links are respectively connected to a plurality of other networks external to said network and served a particular region, each of said other networks being a source of telecommunications calls routed to said network, and wherein said means for routing includes means, operative in response to receipt of a telecommunications call identifying a telephone station within said region, for selecting one of said other external networks and for then routing said call to said one of said other external networks, said selection being a function of a percentage of the total number calls that said network receives from said region via said other external networks within a predetermined period of time.

13. The arrangement set forth in claim 12 wherein said means for selecting said one of said other networks includes means, operative in the event that said call cannot be routed to said region via said one of said other networks, for then routing said call to another one of said other external networks, said selection of said other one of said other networks being a function of another percentage of the total number of calls that said network receives from said region via said other networks within said predetermined period of time.

14. The arrangement set forth in claim 13 wherein said means for selecting said one of said other networks includes means, operative in the event that said call cannot be routed to said region via any one of said other external networks, for then routing said call to another network contained in another region, in which said other network is connected to at least one of said plurality of other networks.

15. An arrangement for routing a call through a network to an external switching office, said network comprising a plurality of network nodes, said arrangement comprising
- a plurality of communications links interconnecting individual ones of said plurality of network nodes,
- a plurality of other communications links respectively connecting said external switching office to at least two of said plurality of network nodes, said at least two nodes having stored therein respective routing treatments for controlling the routing of telephone calls to said external switching office that said at least two nodes receive from another one of said plurality of network nodes, and
- means, contained in at least said other node and responsive to receipt of a telecommunications call that is to be terminated at said external switching office, for routing said call to one of said at least two nodes in accordance with a respective one of a plurality of other routing treatments stored in said other node and associated with said external switching office, in which said one of said other routing treatments includes information at least identifying said one of said at least two nodes.

16. The arrangement set forth in claim 15 wherein said means for routing to said one of said at least two nodes includes means for identifying said one routing treatment as a function of a destination number associated with said call.

17. The arrangement set forth in claim 15 wherein said means for routing includes means for selecting said one of said other routing treatments based on a predetermined percentage of the total number of telecommunications calls that said other node sends to said external switching office within a predetermined period of time via both of said at least two nodes, said predetermined percentage being associated with said one of said other routing treatments.

18. The arrangement set forth in claim 17 wherein each of said plurality of other routing treatments stored in said other node includes (a) one of a plurality of routing selections including, but not limited to, a class of routing treatments specifying either hierarchical or real time network routing; and (b) a respective routing indicator having a predetermined value, and wherein said means for routing further includes means for causing said routing indicator to be routed to said one of said at least two nodes along with a destination number associated with said telecommunications call.

19. The arrangement set forth in claim 18 wherein said arrangement further comprises means contained in at least said one of said at least two nodes and operative upon receipt of said call and said routing indicator for routing to said external switching office said call in accordance with a first routing treatment stored in said one of said at least two nodes and associated with a routing indicator having a value that is equal to or less than the value of said received routing indicator.

20. The arrangement set forth in claim 19 wherein said means for routing to said external switching office includes means operative in the event that the respective communications link connecting said one of said at least two nodes to said external switching office is not available for returning to said other node an egress-busy signal.

21. The arrangement set forth in claim 20 wherein said means for routing to said one of said at least two nodes includes means, operative upon receipt of said egress-busy signal, for causing said call to be routed to the other one of said at least two nodes in accordance with another one of said other routing treatments.

22. The arrangement set forth in claim 15 wherein said external switching office is a local switching office.

23. The arrangement set forth in claim 15 wherein said external switching office is customer provided equipment.

24. The arrangement set forth in claim 15 wherein said external switching office is a computer terminal.

25. The arrangement set forth in claim 15 wherein said external switching office is an overseas switching center.

26. The arrangement set forth in claim 15 wherein ones of said plurality of other communications links are respectively connected to a plurality of other networks external to said network and served a particular region, each of said other networks being a source of telecommunications calls processed by said network, and wherein said means for routing includes means, operative in response to receipt of a telecommunications call identifying a telecommunications station within said region, for selecting one of said other networks and for then routing said call to said one of said other networks, said selection being a function of the percentage of the total number of calls that said network receives from said region via said other networks within a predetermined period of time.

27. The arrangement set forth in claim 26 wherein said means for selecting said one of said other networks includes means, operative in the event that said call cannot be routed to said region via said one of said other networks, for then routing said call to another one of said other networks, said selection of said other one of said other networks being a function of another percentage of the total number of calls that said network receives from said region via said other networks within said predetermined period of time.

28. The arrangement set forth in claim 26 wherein said means for selecting said one of said other networks includes means, operative in the event that said call cannot be routed to said region via any one of said other networks, for then routing said call to another network external to said network and connected to at least one of said plurality of other networks.

29. The arrangement set forth in claim 15 wherein said means for routing to said one of said at least two nodes includes means operative in the event that said call cannot be routed to said one of said at least two nodes for then causing said call to be routed to the other one of said at least two nodes in accordance with another one of said other routing treatments identifying the latter node.

30. In a telecommunications network comprising a plurality of network nodes and a plurality of communications links interconnecting individual ones of said plurality of network nodes a method of arranging said network for routing telecommunications calls, said method comprising the steps of providing a plurality of other communications links to connect at least one switching office external to said network to at least two of said plurality of network nodes so that telecommunications calls may be routed to said at least one switching office, and arranging at least another one of said plurality of network nodes so that it responds to receipt of a telecommunications call identified by a respective number associated with said external switching office by routing said call to one of said at least two nodes based on a predetermined percentage of the total number of telecommunications calls that said other node sends to said external switching office via said at least two nodes within a predetermined period of time.

31. In a telecommunications network comprising a plurality of network nodes interconnected via respective ones of a plurality of communications links a method of arranging said network for routing telecommunications calls, said method comprising the steps of providing a plurality of other communications links to connect a switching office external to said network to at least two of said plurality of network nodes, storing in said at least two nodes respective routing treatments for controlling the routing of telecommunications calls to said external switching office that said at least two nodes receive from another one of said plurality of network nodes, and arranging at least said other node so that it responds to receipt of a telecommunications call terminating at said external switching office by routing said call to one of said at least two nodes in accordance with a respective one of a plurality of other routing treatments stored in said other node and associated with said external switching office, in which said one of said other routing treatments includes information identifying said one of said at least two nodes.

* * * * *